United States Patent
Puskar, Jr. et al.

(10) Patent No.: US 9,110,492 B2
(45) Date of Patent: Aug. 18, 2015

(54) ASSEMBLY HAVING A SOFT-TOUCH USER INTERFACE FOR CONTROLLING THE OPERATIVE POSITION OF A DEVICE WHICH CONTROLS THE FLOW OF AIR INTO THE PASSENGER COMPARTMENT OF A VEHICLE

(71) Applicant: Global IP Holdings, LLC, Sterling Heights, MI (US)

(72) Inventors: Dennis W. Puskar, Jr., Algonac, MI (US); Steven M. Johnson, Shelby Township, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 128 days.

(21) Appl. No.: 13/873,302

(22) Filed: Apr. 30, 2013

(65) Prior Publication Data

US 2014/0318308 A1  Oct. 30, 2014

(51) Int. Cl.
*G05G 1/10* (2006.01)
(52) U.S. Cl.
CPC .............. *G05G 1/10* (2013.01); *Y10T 74/2084* (2015.01)

(58) Field of Classification Search
USPC ................................................. 74/553; 454/69
See application file for complete search history.

(56) References Cited

U.S. PATENT DOCUMENTS

| | | | |
|---|---|---|---|
| 6,582,293 B1 | 6/2003 | Siniarski et al. | |
| 6,780,098 B2 * | 8/2004 | Nishida et al. | 454/155 |
| 7,404,760 B2 * | 7/2008 | Bowler et al. | 454/69 |
| 7,575,510 B2 * | 8/2009 | Kim | 454/155 |
| 7,997,964 B2 * | 8/2011 | Gehring et al. | 454/155 |
| 2006/0073781 A1 * | 4/2006 | Mochizuki et al. | 454/152 |

* cited by examiner

*Primary Examiner* — Vicky Johnson
(74) *Attorney, Agent, or Firm* — Brooks Kushman P.C.

(57) ABSTRACT

An assembly having a soft-touch user interface for controlling the operative position of a device which controls the flow of air into the passenger compartment of a vehicle is provided. An occupant of the vehicle operates a first member of the assembly at its outer soft-touch, surface layer to cause the first member to rotate about an axis. A second member of the assembly rotatably supports the first member. A portion of a structural substrate of the first member is configured to couple the first member to the device. The substrate and the second member have a pair of annular faces that oppose each other and are oriented to face axially along the axis. A portion of a biasing member projects outwardly from at least one pocket in one of the faces to frictionally engage the other face and prevent undesired rotational movement of the first member.

19 Claims, 4 Drawing Sheets

ASSEMBLY HAVING A SOFT-TOUCH USER INTERFACE FOR CONTROLLING THE OPERATIVE POSITION OF A DEVICE WHICH CONTROLS THE FLOW OF AIR INTO THE PASSENGER COMPARTMENT OF A VEHICLE

TECHNICAL FIELD

This invention generally relates to interior vehicle assemblies and, in particular, to air vent control assemblies that vehicle occupants can use to control the flow of air into a passenger compartment of the vehicle.

OVERVIEW

Automotive vehicle air conditioning and ventilation systems include air vent control assemblies that vehicle occupants can use to control the amount of air flowing into a vehicle passenger compartment as well as the direction of airflow. Some air vent control assemblies include damper doors that are pivotally supported near the exit or exhaust end of air passages and that provide fluid communication between air sources and passenger compartments. Such assemblies may also include one or more air louvers that are pivotable to direct airflow from air passages into passenger compartments.

U.S. Pat. No. 6,582,293 discloses an air vent damper apparatus which includes a damper lever in the form of a thumbwheel supported adjacent the exit end of the air passage. The thumbwheel is supported in a thumbwheel housing of the vent outlet assembly for pivotal motion about a thumbwheel pivot axis. The thumbwheel includes a pivot mount comprising upper and lower axially-extending cylindrical posts that extend through circular apertures in respective upper and lower walls of the thumbwheel housing. A ribbed circumferential section of the thumbwheel is exposed through an elongated generally horizontal window in a front grill panel of the vent outlet assembly in a position to be manipulated by a vehicle occupant. The thumbwheel is operably connected to the damper door by a mechanical linkage configured to pivot the damper door in response to movement of the thumbwheel. A ring-type spring bushing is positioned and configured to provide sufficient friction to prevent uncommanded movement of the damper door.

One problem with conventional thumbwheel designs is that such designs have pivots, stops and detents located on the air outlet housings. As a result, packaging space is sacrificed. Additional outside components/features add to process variation, dimensional stack-up issues and attachment schemes which can affect overall feel of the system.

Most components of air vent control assemblies are largely invisible to the user of such assemblies and are designed to obtain the mechanical properties needed to control the door and/or air louvers of the system without hinge binding. However, the user interface of the assembly such as a thumbwheel is exposed to the occupant of the automotive vehicle for user manipulation. Consequently, the user interface must meet a number of competing performance specifications For example, automotive interior parts exposed to direct sunlight tend to experience extremely high surface heating when such vehicles are parked in non-shaded areas and during the summer months in many parts of the world. The exposed surfaces of the automotive interior parts are known to reach temperatures in excess of 100° C., especially in tropical and equatorial regions of the world. Many automobiles OEMs have specified stringent performance requirements to address the durability of automotive interior parts exposed to such high service temperatures.

Also, it is highly desirable that the user interface provide a degree of aesthetic appearance and/or feel while providing a degree of physical protection to the elements that the interface conceals. In some applications, it is desirable that the exposed interface provide properties such as, for example, aesthetic appeal (for example, visual appearance and/or feel) and resistance to perspiration, heat, water, oil and chemicals.

Also, it is highly desirable that such user interface be provided while minimizing assembly steps which often involve costly labor which adds to the cost and time of assembly manufacture. Also, the materials making up such assemblies should be recyclable if possible.

SUMMARY OF EXAMPLE EMBODIMENTS

An object of at least one embodiment of the present invention is to provide a compact, self-contained, assembly having a soft-touch user interface for controlling the operative position of a device which controls the flow of air into the passenger compartment of a vehicle.

In carrying out the above object and other objects of at least one embodiment of the present invention, an assembly for controlling the operative position of a device which controls the flow of air into the passenger compartment of a vehicle is provided. The assembly includes first and second members. The first member is supported by the second member for rotation about a rotational axis. The first member includes an outer surface layer of a soft-touch plastic material bonded to a substrate of a structural plastic material different from but compatible with the soft-touch plastic material. An occupant of the vehicle operates the first member at the outer surface layer to cause the first member to rotate about the axis. A portion of the substrate is configured to couple the first member to the device to control the position of the device. The substrate of the first member and the second member have a pair of annular faces that oppose each other and are oriented to face axially along the rotational axis. A first face of the pair of annular faces has at least one pocket. Each pocket receives a portion of a biasing member which projects outwardly from the at least one pocket to frictionally engage a second face of the pair and prevent undesired rotational movement of the first member while permitting desired rotation of the first member about the axis during operation of the first member at the outer surface layer by the occupant.

The substrate may have a stop and the second member may have a stop. The stops are engaged at a predetermined angular position of the substrate relative to the second member to prevent rotation of the first member in a first direction about the axis.

The second member may include a pair of connected rim parts. The substrate of the first member is retained and supported by the second member between the rim parts for rotation about the axis.

Each of the rim parts may be formed as a unitary molded part from a rigid thermoplastic in an injection molding process.

The soft-touch plastic material may be a relatively flexible or semi-rigid thermoplastic material and the structural plastic material may be a relatively rigid thermoplastic material.

The structural plastic material may be selected from the group made up of rigid thermoplastic polyolefin material including polypropylene (PP), acrylonitrile butadiene styrene (ABS), polycarbonate (PC), polyvinylchloride (PVC) and acrylonitrile butadiene styrene/polycarbonate (ABS/PC).

The soft-touch plastic material may be selected from the group made up of flexible or semi-rigid thermoplastic material including thermoplastic elastomers (TPE), polypropylene/styrene ethylene butylenes styrene (PP/SEBS), polypropylene/ethylene propylene diene monomer (PP/EPDM), thermoplastic-urethane elastomers (TPU) and flexible polyvinylchloride (PVC).

The outer surface layer and the substrate may be formed from different thermoplastics in a localized injection overmolding process.

The biasing member may be a leaf spring having opposite ends.

The assembly may further include a decorative accent member connected to the substrate layer and having an elongated window extending therethrough to allow the occupant to operate the first member at the outer surface layer.

Further in carrying out the above object and other objects of at least one embodiment of the present invention a self-contained thumbwheel assembly having a soft-touch user interface for controlling the operative position of a device which controls the flow of air into an interior compartment of an automotive vehicle is provided. The assembly includes first and second members. The first member is supported by the second member for rotation about a rotational axis. The first member has an outer surface layer of a soft-touch plastic material bonded to a substrate of a structural plastic material different from but compatible with the soft-touch plastic material. An occupant of the vehicle operates the first member at the outer surface layer to cause the first member to rotate about the axis. A portion of the substrate is configured to couple the first member to the device to control the position of the device. The substrate of the first member and the second member have a pair of annular faces that oppose each other and are oriented to face axially along the rotational axis. A first face of the pair of annular faces has at least one pocket. Each pocket receives a portion of a biasing member which projects outwardly from the at least one pocket to frictionally engage a second face of the pair and prevent undesired rotational movement of the first member while permitting desired rotation of the first member about the axis during operation of the first member at the outer surface layer by the occupant.

Still further in carrying out the above object and other objects of at least one embodiment of the present invention, a manually-operable assembly having a soft-touch user interface for controlling the operative position of a device which controls the flow of air into the passenger compartment of a motor vehicle is provided. The assembly includes first and second members. The first member is supported by the second member for rotation about a rotational axis. The first member includes an outer surface layer of a soft-touch plastic material bonded to a substrate of a structural plastic material different from but compatible with the soft-touch plastic material. An occupant of the vehicle operates the first member at the outer surface layer to cause the first member to rotate about the axis. A portion of the substrate is configured to couple the first member to the device to control the position of the device. The substrate of the first member and the second member have a pair of annular faces that oppose each other and are oriented to face axially along the rotational axis. A first face of the pair of annular faces have at least one pocket. Each pocket receives a portion of a biasing member which projects outwardly from the at least one pocket to frictionally engage a second face of the pair and prevent undesired rotational movement of the first member while permitting desired rotation of the first member about the axis during operation of the first member at the outer surface layer by the occupant.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
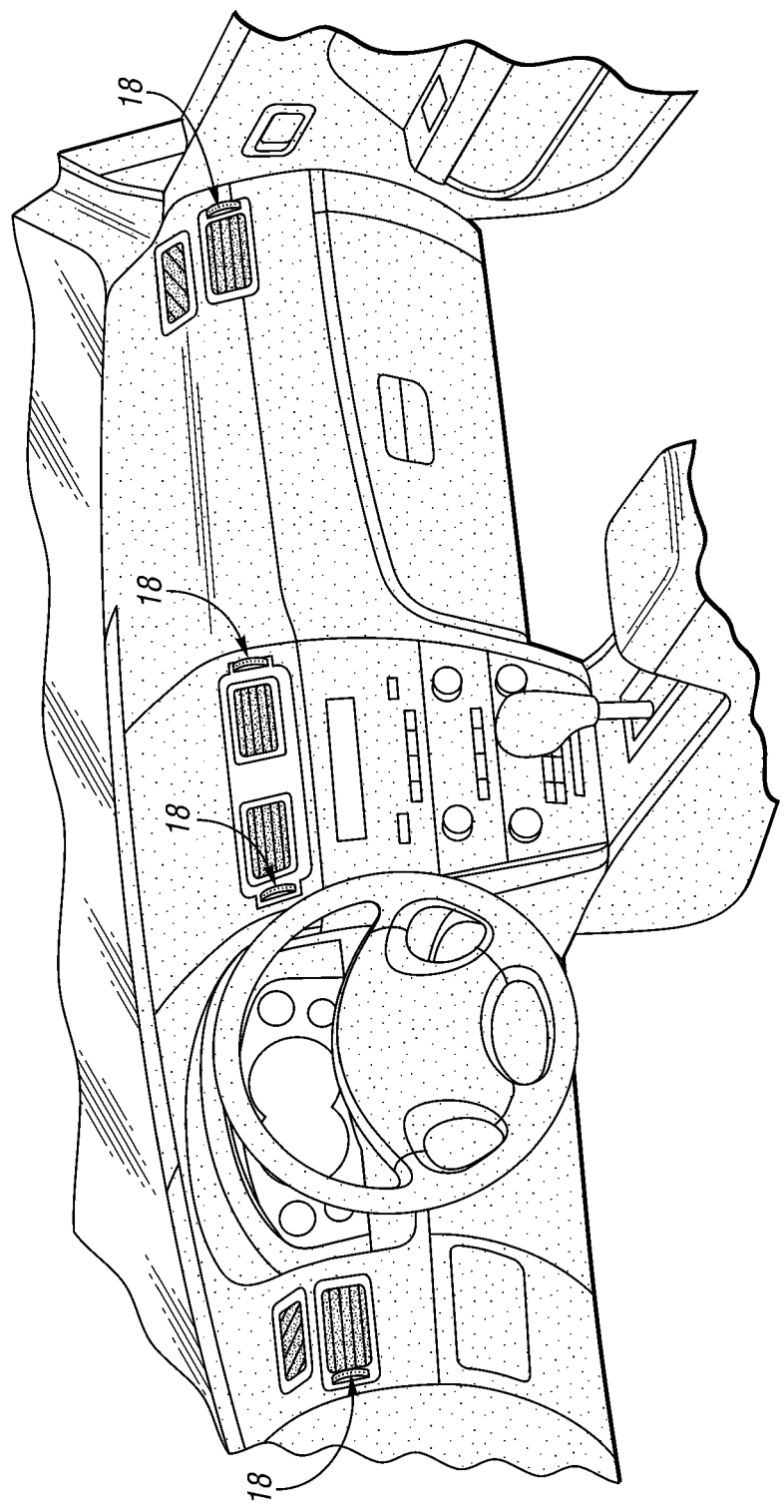
FIG. 1 is an environmental view, partially broken away, of a motor vehicle interior in which an assembly of at least one embodiment of the present invention can be used.

Referring now to FIG. 1, the interior of a passenger compartment of an automotive vehicle is shown and provides an environment for at least one embodiment of the invention. An assembly of at least one embodiment of the invention has a soft-touch user interface in the form of a soft-touch outer surface layer 18 of a member 12 for controlling the operative position of a device such as a door or louvers which controls the flow of air into the passenger compartment.

Figure 2:
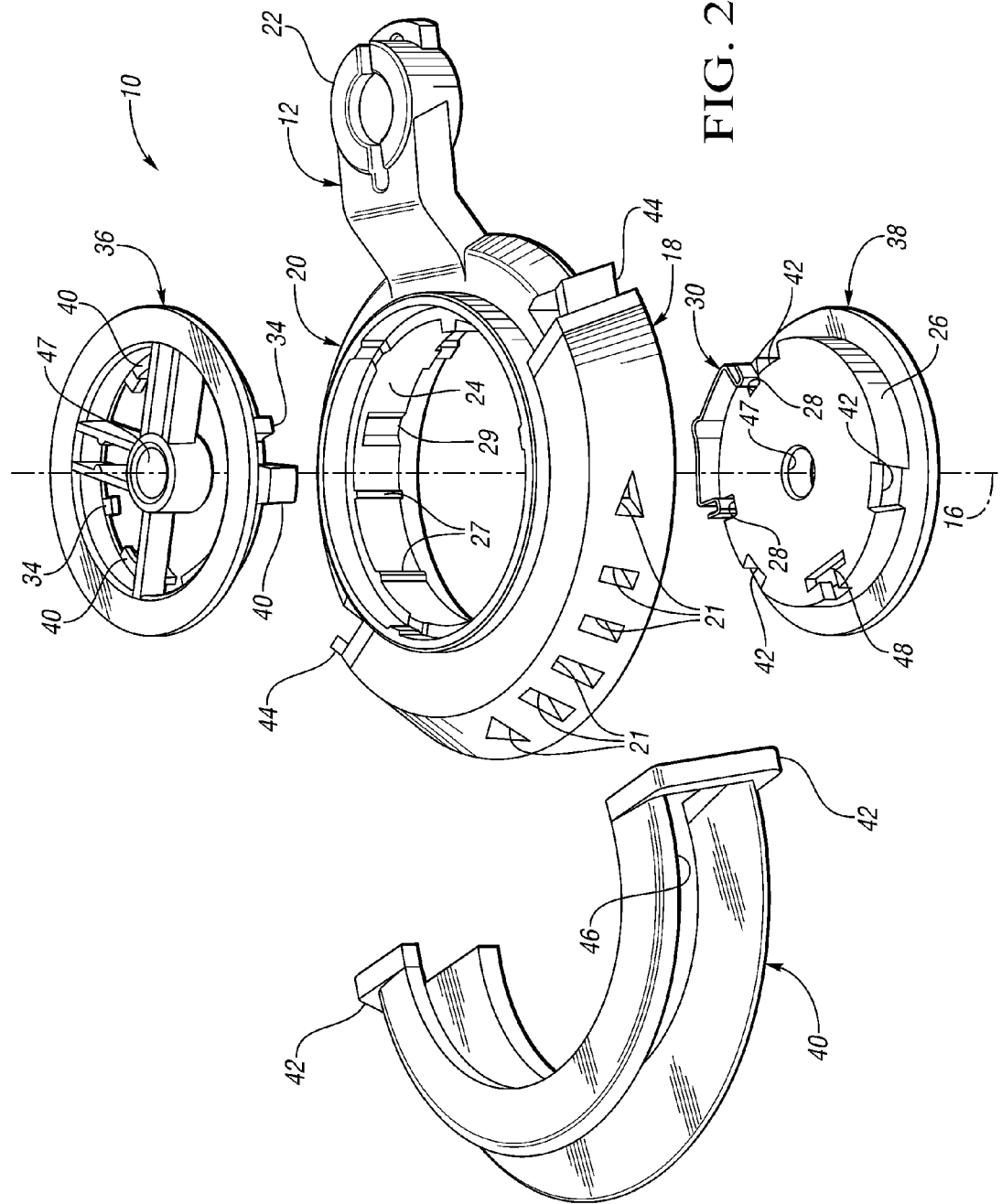
FIG. 2 is an exploded perspective view of the assembly of FIG. 1.
Figure 3:
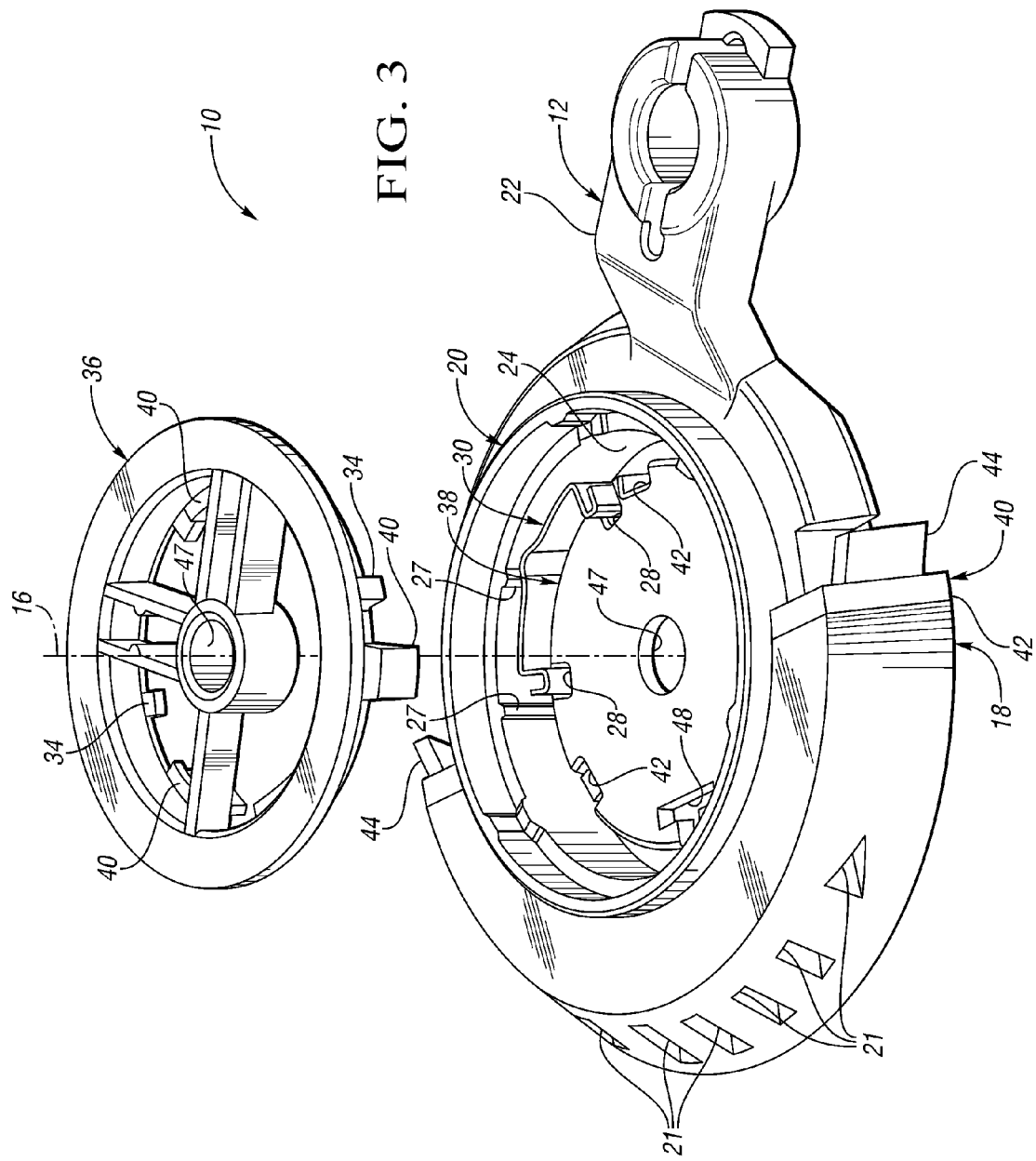
FIG. 3 is a perspective view of the assembly of FIG. 2 prior to its complete assembly.
Figure 4:
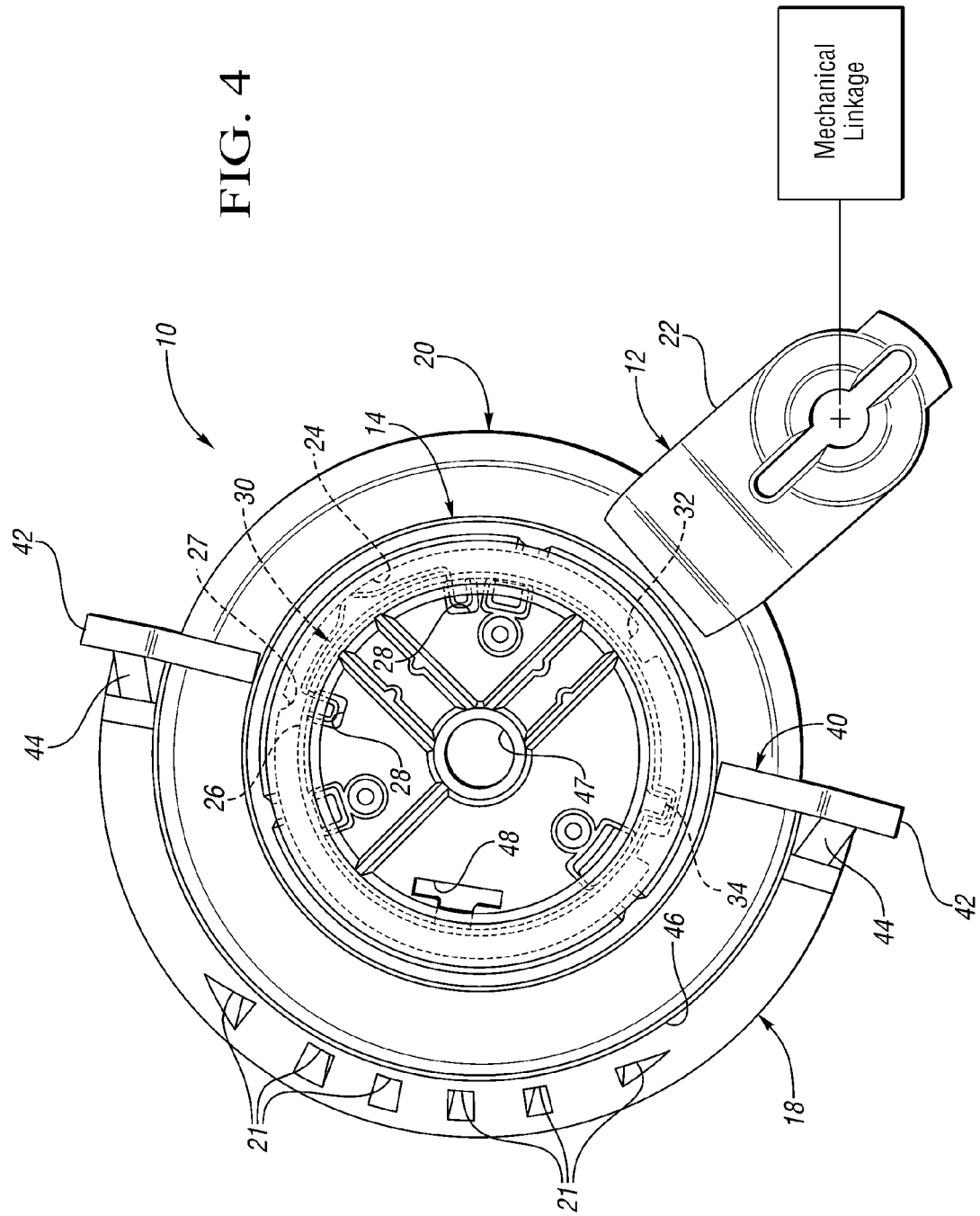
FIG. 4 is a top plan view of the assembly showing its connection or coupling to mechanical linkage as shown by a block.

Referring now to FIGS. 2-4, the assembly, generally indicated at 10, includes first and second members 12 and 14, respectively. The first member 12 is supported by the second member 14 for rotation about a rotational axis 16. The first member 12 includes the outer surface layer 18 of a soft-touch plastic material bonded to a substrate 20 of a structural plastic material different from but compatible with the soft-touch plastic material. An occupant of the vehicle operates the first member 12 at the outer surface 18 (as shown in FIG. 1) to cause the first member 12 to rotate about the axis 16. Indicia 21 are formed in the outer surface layer 18 to provide control information to the occupant. A portion 22 of the substrate 20 is configured, such as being apertured, to couple the first member 12 to the device 12 to control the position of the door or louvers.

The substrate 20 of the first member 12 and the second member 14 having a pair of annular faces 24 and 26, respectively, that oppose each other and are oriented to face axially along the rotational axis 16.

A first face 26 of the pair of annular faces 24 and 26 has one or more pockets 28. Each pocket 28 receives a portion of a biasing member a leaf spring, generally indicated at 30, which projects outwardly from the pockets 28 to frictionally engage a second face 24 of the pair and prevent undesired rotational movement of the first member 12 while permitting desired rotation of the first member 12 about the axis 16 during operation of the first member 12 at the outer surface layer 18 by the vehicle occupant.

The substrate 20 has a stop 32 and the second member 14 has stops 34. The stops 32 and 34 are engaged at predetermined angular positions of the substrate 20 relative to the second member 14 to limit rotation of the first member 12 in first and second directions about the axis 16.

The second member 14 includes a pair of rim parts 36 and 38 which are connected together at male and female connectors 40 and 42, respectively. The substrate 22 of the first member 26 is retained and supported by the second member 14 between the rim parts 36 and 38 for rotation about the axis 16.

The annular face 24 also has a loading detent or alignment groove 29 to permit proper assembly of the substrate 20 with the spring 30 when the spring 30 is mounted in the rim part 38. The annular face 24 also has detents 27 which are used to angularly align the rim parts 36 and 38 just prior to interconnecting the parts 36 and 38 after rotation of the part 38 relative to the substrate 20.

The rim part 38 may include an aperture 48 to receive an LED lamp to provide back illumination to the outer surface layer 18 so that a user can see the layer 18 at night.

Each of the rim parts 36 and 38 is preferably formed as a unitary molded part from a rigid thermoplastic in an injection molding process.

The soft-touch plastic material is a relatively flexible or semi-rigid thermoplastic material and the structural plastic material is a relatively rigid thermoplastic material.

The structural plastic material is selected from the group made up of rigid thermoplastic polyolefin material including polypropylene (PP), acrylonitrile butadiene styrene (ABS), polycarbonate (PC), polyvinylchloride (PVC) and acrylonitrile butadiene styrene/polycarbonate (ABS/PC).

The soft-touch plastic material is selected from the group made up of flexible or semi-rigid thermoplastic material including thermoplastic elastomers (TPE), polypropylene/styrene ethylene butylenes styrene (PP/SEBS), polypropylene/ethylene propylene diene monomer (PP/EPDM), thermoplastic-urethane elastomers (TPU) and flexible polyvinylchloride (PVC).

The outer surface layer 18 and the substrate 20 are preferably formed from different thermoplastics in a localized injection overmolding process.

The assembly 10 further includes a decorative accent member, generally indicated at 40, connected to the substrate 20 at connectors 42 and 44. The member 40 has an elongated window 46 extending therethrough to allow the occupant to operate the first member 12 at the outer surface layer 18.

Each of the first and second members 12 and 14, respectively, includes a central aperture 47 which when aligned as shown in FIG. 4 allows the entire assembly 10 to be fastened via a fastener (not shown) to a stationary member (not shown) of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly having a soft-touch user interface for controlling the operative position of a device which controls the flow of air into the passenger compartment of a vehicle, the assembly comprising:

first and second members, the first member being supported by the second member for rotation about a rotational axis, the first member including an outer surface layer of a soft-touch plastic material bonded to a substrate of a structural plastic material different from but compatible with the soft-touch plastic material, an occupant of the vehicle operating the first member at the outer surface layer to cause the first member to rotate about the axis, a portion of the substrate being configured to couple the first member to the device to control the position of the device;

the substrate of the first member and the second member having a pair of annular faces that oppose each other and are oriented to face axially along the rotational axis;

a first face of the pair of annular faces having a pocket, the pocket receiving a portion of a leaf spring which projects outwardly from the pocket to frictionally engage a second face of the pair and prevent undesired rotational movement of the first member while permitting desired rotation of the first member about the axis during operation of the first member at the outer surface layer by the occupant.

2. The assembly as claimed in claim 1, wherein the first member has a stop and the second member has at least one stop and wherein the stops are engaged at at least one predetermined angular position of the substrate relative to the second member to limit rotation of the first member in at least one direction about the axis.

3. The assembly as claimed in claim 1, wherein the second member includes a pair of connected rim parts, the substrate of the first member being retained and supported by the second member between the rim parts for rotation about the axis.

4. The assembly as claimed in claim 3, wherein each of the rim parts is formed as a unitary molded part from a rigid thermoplastic in an injection molding process.

5. The assembly as claimed in claim 1, wherein the soft-touch plastic material is a relatively flexible or semi-rigid thermoplastic material and the structural plastic material is a relatively rigid thermoplastic material.

6. The assembly as claimed in claim 5, wherein the structural plastic material is selected from the group made up of rigid thermoplastic polyolefin material including polypropylene (PP), acrylonitrile butadiene styrene (ABS), polycarbonate (PC), polyvinylchloride (PVC) and acrylonitrile butadiene styrene/polycarbonate (ABS/PC).

7. The assembly as claimed in claim 5, wherein the soft-touch plastic material is selected from the group made up of flexible or semi-rigid thermoplastic material including thermoplastic elastomers (TPE), polypropylene/styrene ethylene butylenes styrene (PP/SEBS), polypropylene/ethylene propylene diene monomer (PP/EPDM), thermoplastic-urethane elastomers (TPU) and flexible polyvinylchloride (PVC).

8. The assembly as claimed in claim 1, wherein the outer surface layer and the substrate are formed from different thermoplastics in a localized injection overmolding process.

9. The assembly as claimed in claim 1, further comprising a decorative accent member connected to the substrate and having an elongated window extending therethrough to allow the occupant to operate the first member at the outer surface layer.

10. A self-contained thumbwheel assembly having a soft-touch user interface for controlling the operative position of a device which controls the flow of air into an interior compartment of an automotive vehicle, the assembly comprising:

first and second members, the first member being supported by the second member for rotation about a rotational axis, the first member including an outer surface layer of a soft-touch plastic material bonded to a substrate of a structural plastic material different from but compatible with the soft-touch plastic material, an occupant of the vehicle operating the first member at the outer surface layer to cause the first member to rotate about the axis, a portion of the substrate being configured to couple the first member to the device to control the position of the device;

the substrate of the first member and the second member having a pair of annular faces that oppose each other and are oriented to face axially along the rotational axis;

a first face of the pair of annular faces having a pair of pockets, each pocket receiving a portion of a biasing spring which projects outwardly from the pockets to frictionally engage a second face of the pair and prevent undesired rotational movement of the first member while permitting desired rotation of the first member about the axis during operation of the first member at the outer surface layer by the occupant.

11. The assembly as claimed in claim 10, wherein the first member has a stop and the second member has at least one stop and wherein the stops are engaged at at least one predetermined angular position of the substrate relative to the second member to limit rotation of the first member in at least one direction about the axis.

12. The assembly as claimed in claim 10, wherein the second member includes a pair of connected rim parts, the substrate of the first member being retained and supported by the second member between the rim parts for rotation about the axis.

13. The assembly as claimed in claim 12, wherein each of the rim parts is formed as a unitary molded part from a rigid thermoplastic in an injection molding process.

14. The assembly as claimed in claim 10, wherein the soft-touch plastic material is a relatively flexible or semi-rigid thermoplastic material and the structural plastic material is relatively rigid thermoplastic material.

15. The assembly as claimed in claim 14, wherein the structural plastic material is selected from the group made up of rigid thermoplastic polyolefin material including polypropylene (PP), acrylonitrile butadiene styrene (ABS), polycarbonate (PC), polyvinylchloride (PVC) and acrylonitrile butadiene styrene/polycarbonate (ABS/PC).

16. The assembly as claimed in claim 14, wherein the soft-touch plastic material is selected from the group made up of flexible or semi-rigid thermoplastic material including thermoplastic elastomers (TPE), polypropylene/styrene ethylene butylenes styrene (PP/SEBS), polypropylene/ethylene propylene diene monomer (PP/EPDM), thermoplastic-urethane elastomers (TPU) and flexible polyvinylchloride (PVC).

17. The assembly as claimed in claim 10, wherein the outer surface layer and the substrate are formed from different thermoplastics in a localized injection overmolding process.

18. The assembly as claimed in claim 10, further comprising a decorative accent member connected to the substrate and having an elongated window extending therethrough to allow the occupant to operate the first member at the outer surface layer.

19. A manually-operable assembly having a soft-touch user interface for controlling the operative position of a device which controls the flow of air into the passenger compartment of a motor vehicle, the assembly comprising:

first and second members, the first member being supported by the second member for rotation about a rotational axis, the first member including an outer surface layer of a soft-touch plastic material bonded to a substrate of a structural plastic material different from but compatible with the soft-touch plastic material, an occupant of the vehicle operating the first member at the outer surface layer to cause the first member to rotate about the axis, a portion of the substrate being configured to couple the first member to the device to control the position of the device;

the substrate of the first member and the second member having a pair of annular faces that oppose each other and are oriented to face axially along the rotational axis;

a first face of the pair of annular faces having a pair of pockets, each pocket receiving an end of a leaf spring which projects outwardly from the pockets to frictionally engage a second face of the pair and prevent undesired rotational movement of the first member while permitting desired rotation of the first member about the axis during operation of the first member at the outer surface layer by the occupant.

* * * * *